(12) United States Patent
Tsai et al.

(10) Patent No.: US 6,678,771 B1
(45) Date of Patent: Jan. 13, 2004

(54) METHOD OF ADJUSTING AN ACCESS SEQUENCING SCHEME FOR A NUMBER OF PCI- COMPLIANT UNITS COUPLED TO A PCI BUS SYSTEM

(75) Inventors: Chau-Chad Tsai, Taipei (TW); Wen-Hao Chuang, Hsinchu (TW); Chi-Che Tsai, Kaohsiung Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 517 days.

(21) Appl. No.: 09/687,225

(22) Filed: Oct. 13, 2000

(30) Foreign Application Priority Data

Oct. 16, 1999 (TW) ........................................ 88117936 A

(51) Int. Cl.[7] .............................................. G06F 1/00
(52) U.S. Cl. ........................ 710/111; 710/112; 710/120; 710/125; 710/240; 710/309
(58) Field of Search ................................. 710/111, 112, 710/120, 123, 240–244, 309, 125

(56) References Cited

U.S. PATENT DOCUMENTS 5,623,672 A * 4/1997 Popat ........................ 710/111
5,729,702 A * 3/1998 Creedon et al. ............. 710/111
5,832,278 A * 11/1998 Pham ......................... 710/241
5,898,694 A * 4/1999 Llyadis et al. .............. 370/462
6,073,132 A * 6/2000 Gehman .......................... 707/9
6,321,309 B1 * 11/2001 Bell et al. .................... 711/150
6,393,508 B2 * 5/2002 Rekeita et al. .............. 710/243
6,516,369 B1 * 2/2003 Brelin ........................ 710/111

* cited by examiner

Primary Examiner—Paul R. Myers
Assistant Examiner—Raymond N Phan
(74) Attorney, Agent, or Firm—J. C. Patents

(57) ABSTRACT

A method of adjusting an access sequencing scheme for a number of PCI (Peripheral Component Interconnect) compliant units coupled to a PCI bus system on a computer system. These PCI-compliant units are associated respectively with a set of request signals that allow these PCI-compliant units to request the use of the PCI bus system for data transfer. The access sequencing scheme includes a first-layer access sequence loop and a second-layer access sequence loop, with the first-layer access sequence loop having a higher priority over the second-layer access sequence loop The request signals are assigned to either the first-layer access sequence loop or the second-layer access sequence loop in a predetermined manner. The user can change the assignment of a certian request signal from one loop to the other through PC's BIOS (Basic Input/Output System), so as to allow the associated PCI-compliant unit to have a higher priority level to the use of the PCI bus system.

13 Claims, 5 Drawing Sheets

METHOD OF ADJUSTING AN ACCESS SEQUENCING SCHEME FOR A NUMBER OF PCI- COMPLIANT UNITS COUPLED TO A PCI BUS SYSTEM

CROSS-REFERENCE TO RELATED APPLICATION

This application claims the priority benefit of Taiwan application serial No. 88117936, filed Oct. 16, 1999.

BACKGROUND OF THE INVENTION

1. Field of the Invention

This invention relates to computer technology, and more particularly, to a method of adjusting an access sequencing scheme for a number of PCI (Peripheral Component Interconnect) compliant units coupled to a PCI bus system on a computer system.

2. Description of Related Art

FIG. 1 is a schematic diagram showing the architecture of a computer system with a PCI bus system. As shown, the computer system includes a CPU 10 and a primary memory unit 11, and is coupled via a host bridge 12 (which is also called North Bridge, NB) to a PCI bus system 14 which is further coupled to a number of PCI-compliant units, such as a graphics adapter 16a, an expansion-bus bridge 16b, a LAN adapter 16c, and a SCSI host bus adapter 16d. Each of these adapters can issue a request (RQ) to use the PCI bus system 14 when transaction over the PCI bus system 14 is intended. The request signal is first sent to the host bridge 12 for arbitration. When the request is granted, the host bridge 12 returns a grant signal (GNT) to grant the use of the PCI bus system 14 by the request-issuing adapter.

The data communication between the host bridge 12 and the PCI-compliant units 16a, 16b, 16c, 16d over the PCI bus system 14 is achieved through the use of a set of control signals, including FRAME (cycle frame), AD, (address), CBE (command/byte enable), IRDY (initiator ready), TRDY (target ready), and STOP (stop). Throughout this specification, the term "initiator" refers to the unit that initiates a request to use the PCI bus system 14, which can be either the host bridge 12 or any one of the PCI-compliant units 16a, 16b, 16c, 16d, while the term "target" refers to the unit that the initiator intends to transfer data thereto.

The FRAME signal is issued by the initiator to indicate the starting time and the duration of the intended data communication over the PCI bus system 14. When the FRAME signal is set to LOW state, it enables the initiator to gain access to the PCI bus system 14. During the address phase, the initiator issues the AD signal indicative of the valid address and the CBE signal (CBE[3:0] for enabling the command/byte transfer. The CBE signal is composed of 4 bits which can represent 16 different commands. The CBE signal format is fully described in the PCI standard, so description thereof will not be further detailed. Subsequently, during the data phase, the initiator sends out the AD signal representative of the data to be transferred over the PCI bus system 14 to the target. When the FRAME signal is disabled, it indicates that the transaction is completed. When the initiator is ready to send out data, the IRDY signal is enabled; and when the target is ready to receive the data, the TRDY signal is enabled. During a read operation, the enabling of the IRDY signal indicates that the initiator is ready to receive data from the target; whereas during a write operation, the enabling of the TRDY signal indicates that the target is ready to receive data. When the target wants to stop the transaction, it issues the STOP signal to the initiator.

FIG. 2 is a signal diagram showing the waveforms and timings of the above-mentioned signals specified by the PCI standard for an initiator to perform a read operation on a target. In this signal diagram, the duration indicated by the reference numeral 20 is called a bus transaction period, during which the data exchange is carried out. The bus transaction period 20 includes an address phase 22 and a number of data phases 24a, 24b, 24c. The data phases 24a, 24b, 24c each include a wait cycle, respectively designated by the reference numerals 26a, 26b, 26c, and a data transfer cycle, respectively designated by the reference numerals 28a, 28b, 28c.

The PCI bus system is docked by a system clock signal CLK. During the first period $T_1$ of CLK, the initiator issues a FRAME signal to indicate that it intends to transfer, data to a certain target. Subsequently, the initiator sends out the AD signal indicative of the start address specifying the target where the initiator intends to read data. After this, the initiator sends out the CBE signal. The CBE signal is in the enabled state during all the data phases 24a, 24b, 24c. During the next period $T_2$, the initiator issues the IRDY signal indicating that it is ready for data communication. However, since this period is the wait cycle 26a in the data phase 24a, the target is still unready. During the next period $T_3$, the target is ready and hence issues the TRDY signal indicative of this condition. This causes the target to transfer data to the initiator during the data transfer cycle 28a. During the next period $T_4$, the target disables the TRDY signal, indicating that the transfer of the current piece of data is complete, and then prepares the next piece of data for transfer. This is the wait cycle 26b of the data phase 24b. During the next period $T_5$, the target enables the TRDY signal again, indicating that it is ready to transfer data, When the IRDY signal is also enabled during the data transfer cycle 28b, the initiator starts to read data from the target. During the next period $T_6$, the initiator disables the IRDY signal to indicate that it is unable to receive any more data. However, since the TRDY signal is still in enabled state, the wait cycle 26c is activated by the initiator. During the next period $T_7$, the initiator is again ready to receive data and hence enables the IRDY signal. When the TRDY signal is also enabled during the data transfer cycle 28c, the initiator starts to read data from the target. This completes the read operation.

FIG. 3 is a signal diagram showing the waveforms and timings of various signals specified by the PCI standard for a PCI-compliant unit to request the use of the PCI bus system. As shown, when any of the PCI-compliant units 16a, 16b, 16c, 16d (called the initiator) wants to transfer data over the PCI bus system 14, it issues a request signals RQ during $T_2$. In response, the host bridge 12 issues the GNT signal at $T_6$. This causes the initiator to put the FRAME signal at the LOW state at $T_7$, thus enabling the initiator to use the PCI bus system for data transfer over the PCI bus system.

FIG. 4 is a schematic diagram used to depict a two-layer access sequencing scheme used by the PCI bus system for a number of PCI-compliant units coupled thereto. As shovel, the PCI bus system 14 is coupled between a CPU 10 and a plurality of PCI-compliant expansion slots on which a plurality of peripheral devices can be mounted (each expansion slot and the mounted peripheral device are collectively represented by a single box in FIG. 4 designated by the reference numerals 32, 34, 36, 38, 40). These PCI-compliant units 32, 34, 36, 38, 40 respectively utilize the request signals RQ0, RQ1, RQ2, RQ3, and RQ4 to request the use of the PCI bus system 14. The two-layer access sequencing scheme specifies a sequence loop that the PCI-compliant units 32, 34, 36, 38, 40 are allowed to gain access to the PCI bus system 14.

The two-layer access sequencing scheme includes a first-layer access sequences loop and a second-layer access sequence loop, with the first layer having a higher priority over the second layer. The first-layer access sequence loop is as follows:

CPU→SB→PCI→CPU

The CPU 50 is represented that the CPU access via the host bridge 12 to the PCI bus system 14. The SB 30 is represented that the South Bridge access PCI bus system 14. These PCI-compliant units 32, 34, 36, 38, 40 respectively utilize the request signals RQ0, RQ1, RQ2, RQ3, and RQ4 to request the use of the PCI bus system 14 when transaction over the PCI bus system 14 is intended. The access sequence for these request signals RQ0, RQ1, RQ2, RQ3, and RQ4 is specified by the second-layer access sequence loop as follows:

RQ0→RQ1→RQ2→RQ3→RQ4→RQ0.

One drawback to the forgoing two-layer access sequencing scheme, however, is that it is fixed and thus not adjustable, i.e., each PCI-compliant expansion slot is assigned to a fixed one of the request signals RQ0, RQ1, RQ2, RQ3, and RQ4. For this sake, if a low-priority PCI-compliant expansion slot is installed with a video/audio-based peripheral device, which typically transfers data in very great volumes, the data transfer over the PCI bus system would be considerably low in speed.

SUMMARY OF THE INVENTION

It is therefore an objective of this invention to provide an access sequence adjusting method that allows the user to adjust the access sequence for the PCI-compliant units coupled to the PCI bus system when a certain PCI-compliant Unit, such as a video/audio-based peripheral device, needs a high-priority to transfer a high volume of data.

In accordance with the foregoing and other objectives, the invention proposes a method of adjusting an access sequencing scheme for a number of PCI-compliant units coupled to a PCI bus system on a computer system.

When implemented on a PC, the access sequencing scheme can be adjusted by using the BIOS of the PC to set user-specified values to a special register set. The access sequencing scheme includes a first-layer access sequence loop and a second-layer access sequence loop, with the first-layer access sequence loop having a higher priority over the second-layer access sequence loop.

If a PCI-compliant unit coupled to the PCI bus system transfers data in great volumes, such as a video/audio-based peripheral device but it is associated with a request signal assigned to the second-layer access sequence loop, the invention allows the user to change the request signal to the first-layer access sequence loop to allow the video/audio-based peripheral device to have a higher priority level so that the video/audio-based peripheral device always has priority over others to use the PCI bus system. Moreover, the first-layer access sequence loop includes a number of options to provide various priority levels for the request signal being included therein, selection of which option is determined by the first register. This allows the user to assign a high priority level to any PCI-compliant unit being installed on the PC so as to allow the PCI-compliant unit to use the PCI bus system for an extended period of time. Therefore, a video/audio-based peripheral device can always be assigned the highest priority level to use the PCI bus system for transfer great volumes of video/audio data.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
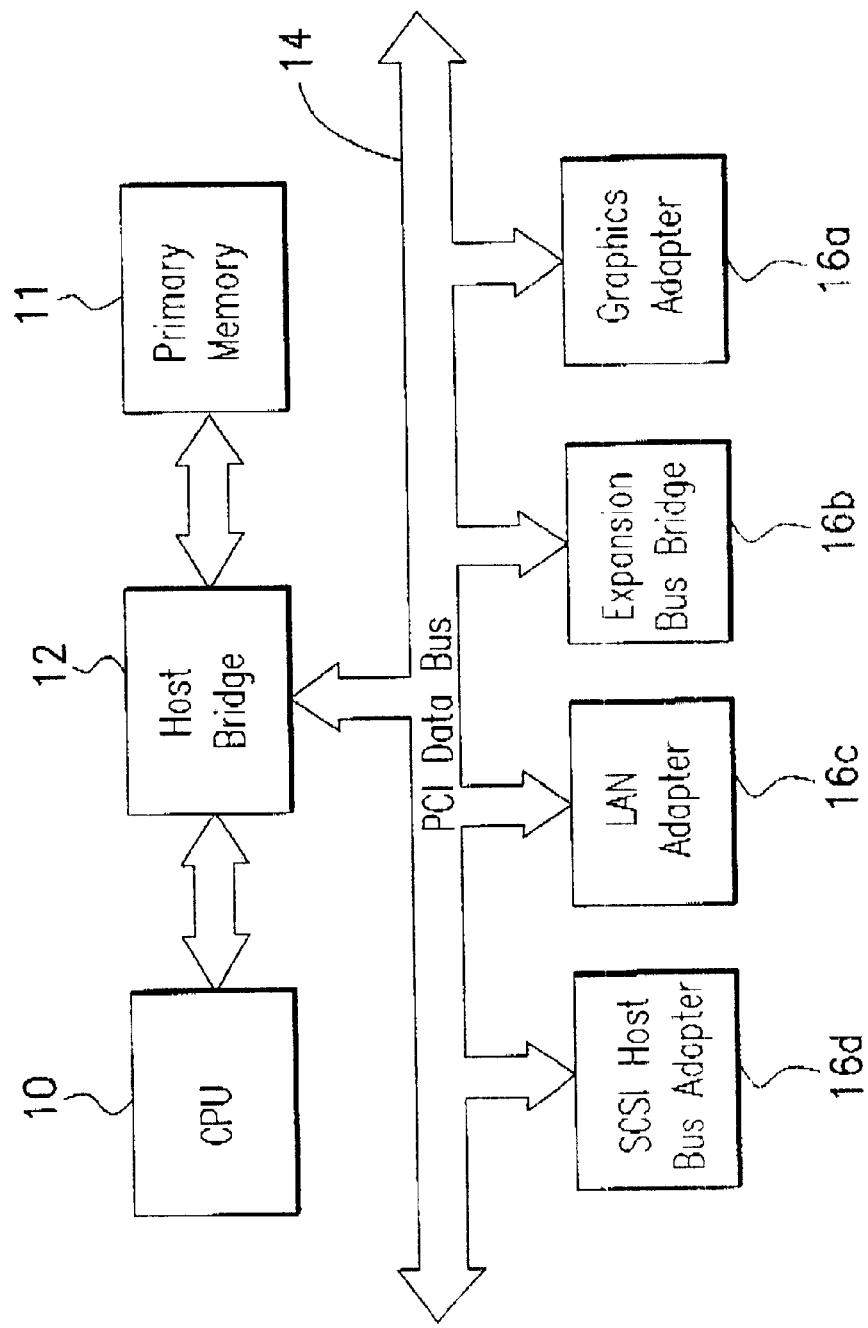
FIG. 1 (PRIOR ART) is a schematic diagram showing the architecture of a computer system with a PCI bus system.
Figure 2:
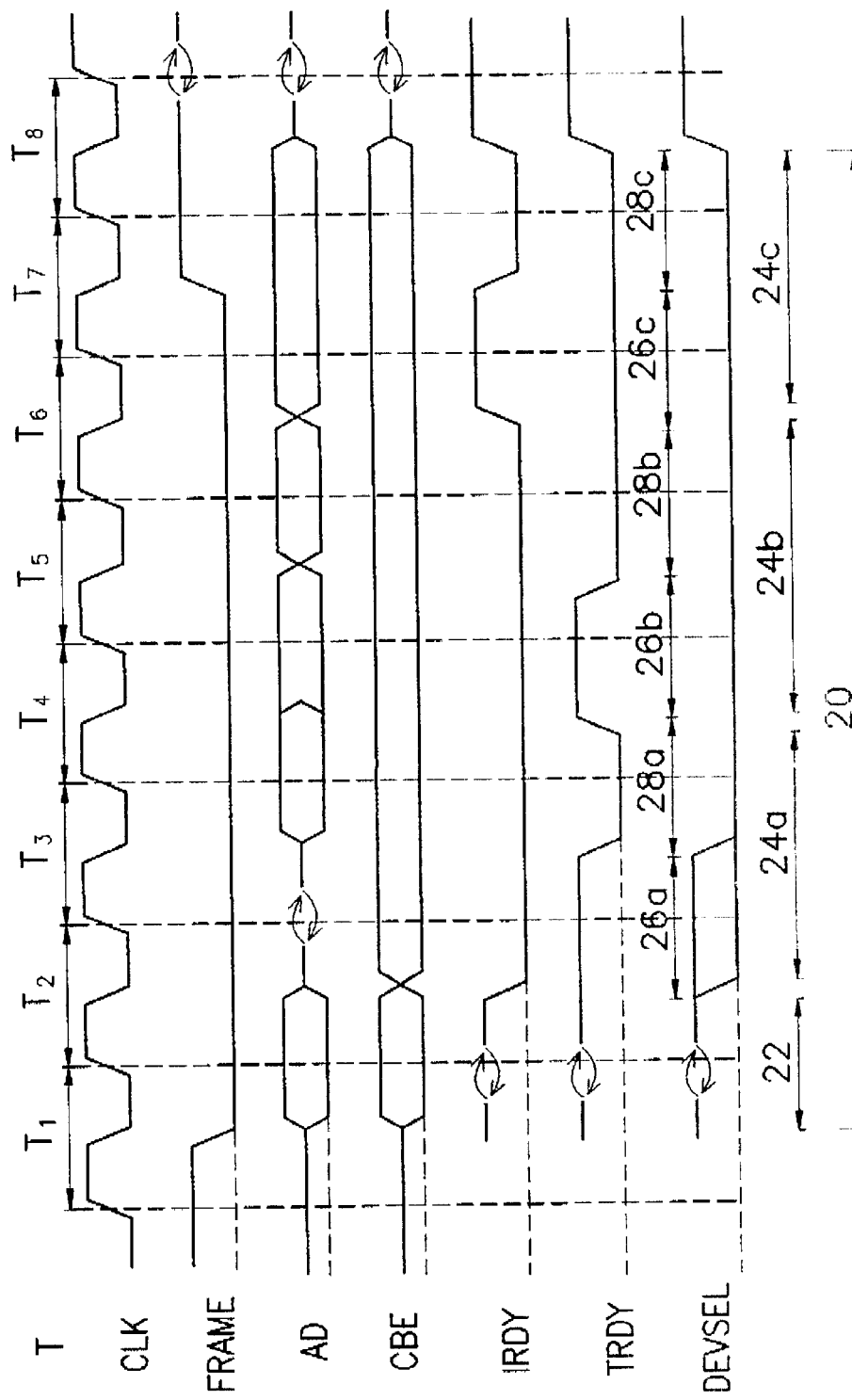
FIG. 2 (PRIOR ART) is a signal diagram showing the waveforms and timings of various signals specified by the PCI standard for an initiator to perform a read operation on a target.
Figure 3:
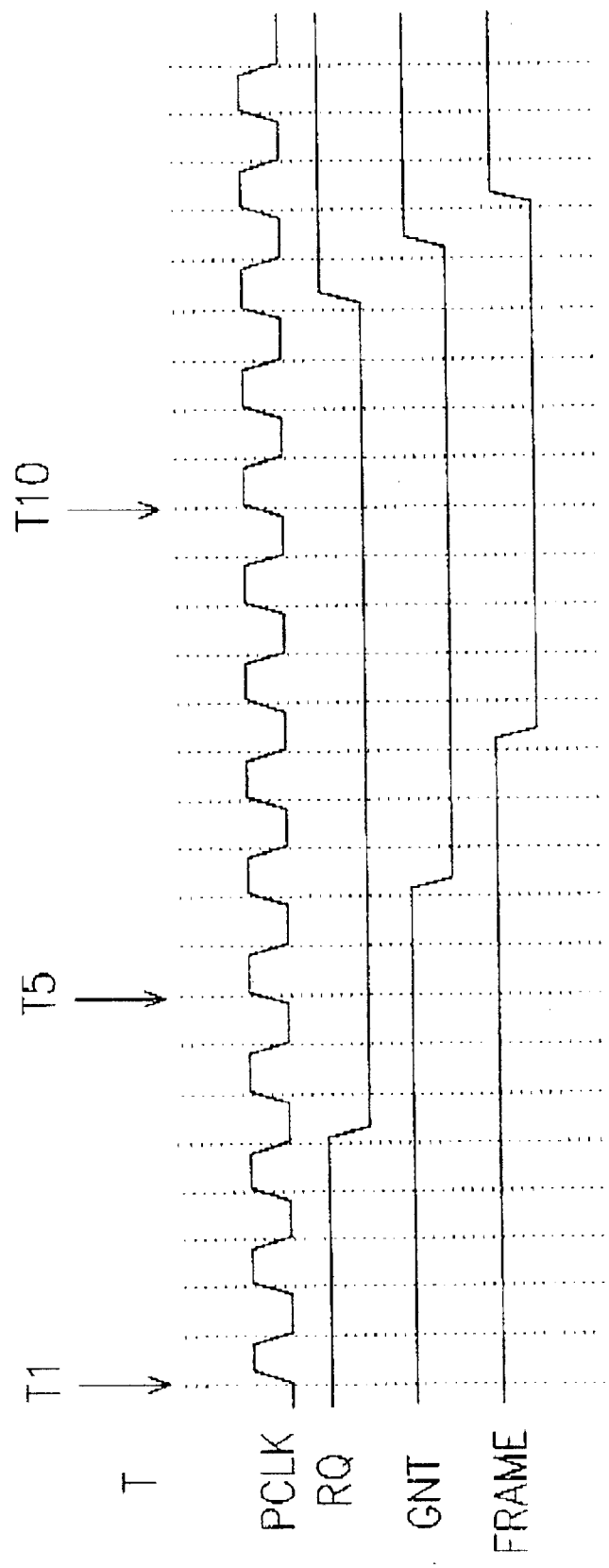
FIG. 3 (PRIOR ART) is a signal diagram showing die waveforms and timings of various signals specified by the PCI standard for a PCI-compliant unit to request the use of the PCI bus system.
Figure 4:
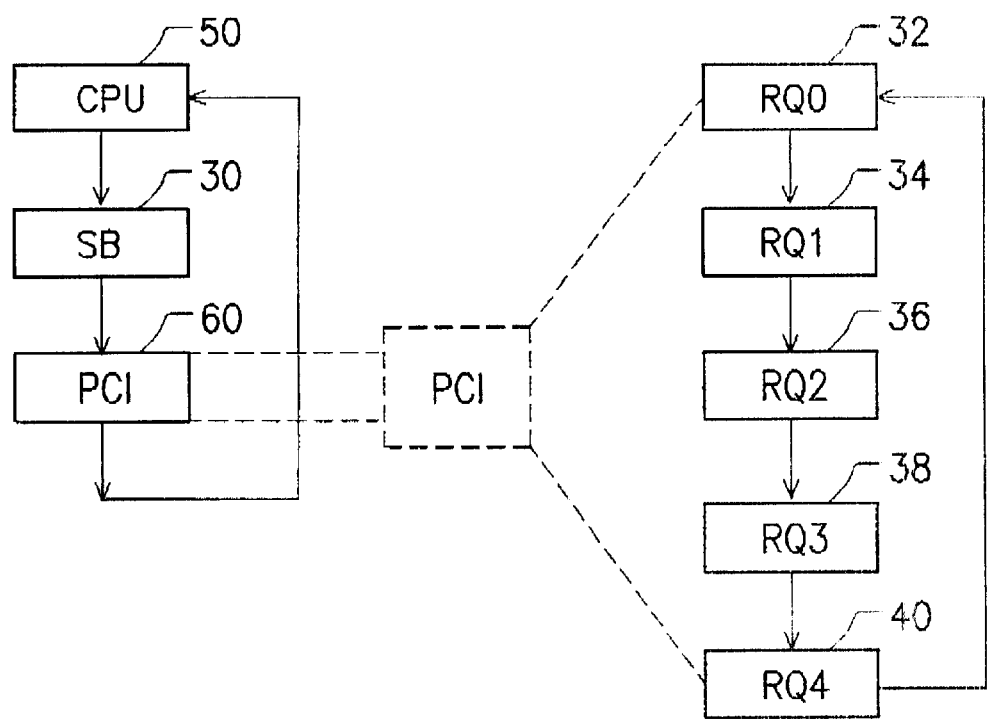
FIG. 4 (PRIOR ART) is a schematic diagram used to depict a conventional two-layer access sequencing scheme utilized by the PCI bus system.
Figure 5:
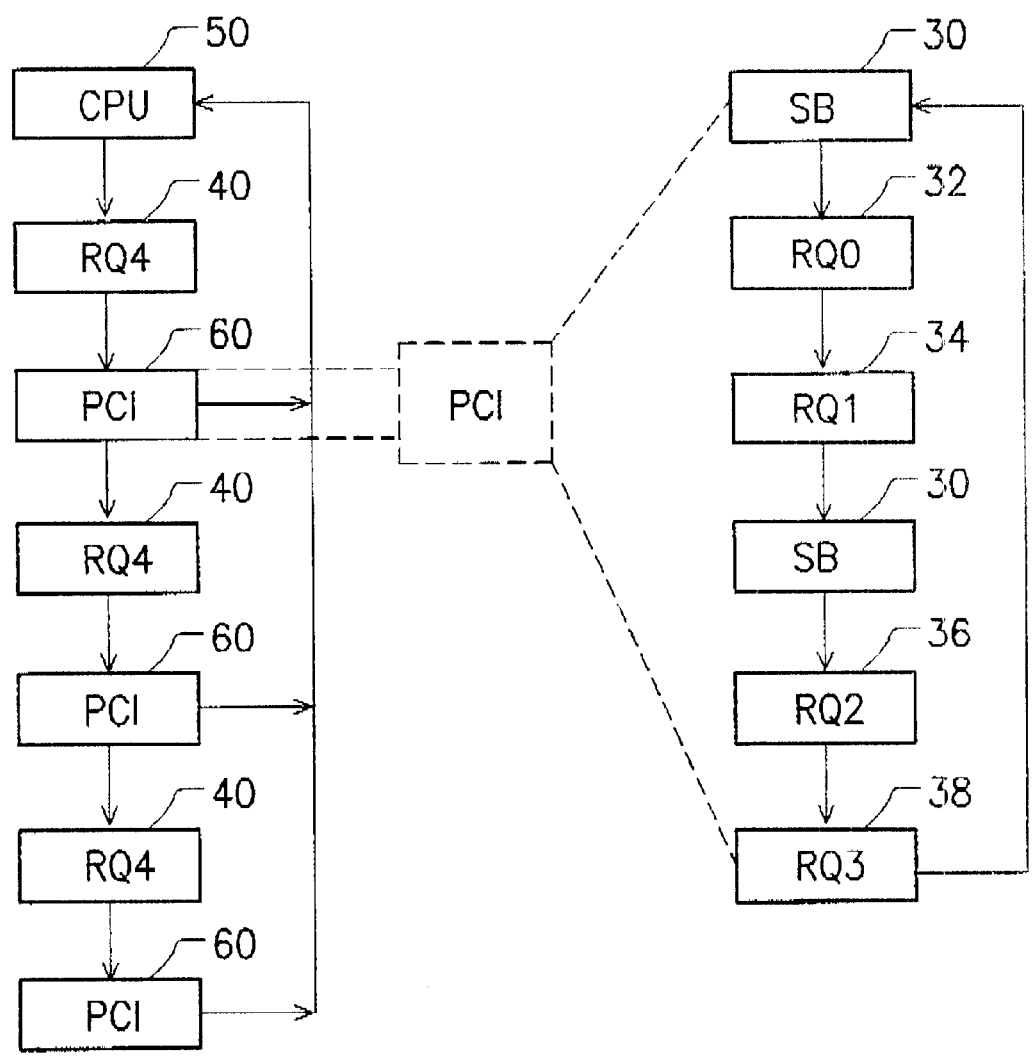
FIG. 5 is a schematic diagram used to depict the two-layer access sequencing scheme used by the method of the invention.

FIG. 5 is a schematic diagram used to depict the two-layer access sequencing scheme used by the method of the invention. It is a characteristic aspect of the invention that a special register RX76[5:0] is used to store the user-specified access sequence loop for the PCI-compliant units coupled to the PCI bus system, which specifies those PCI-compliant units that have a higher priority level to use the PCI bus system 14. The following Table 1 shows an example of the various values specified by RX76[5:0] and the corresponding access sequence loops that are set.

TABLE 1

| Content of RX76[5:0] | Corresponding First-Layer Access Sequence Loop |
|---|---|
| RX76[5:4] = 0X | CPU → RQ4 → PCI → CPU |
| RX76[5:4] = 10 | CPU → RQ4 → PCI → RQ4 → PCI → CPU |
| RX76[5:4] = 11 | CPU → RQ4 → PCI → RQ4 → PCI → RQ4 → PCI → CPU |

Table 1 shows that if RX76[5:4]=0X, the first-layer access sequence loop is set to CPU→RQ4→PCI→CPU, where RQ4 represents the PCI-compliant unit that is assigned to use the RQ4 request signal. Assume the RQ4 unit is a video/audio-based peripheral device that would use the PCI bus system 14 for an extended period of time. In this case, RQ4 is arranged in the first-layer access sequence loop so that RQ4 has a high priority level to use the PCI bus system 14. According to the first-layer access sequence loop, the CPU, the RQ4 unit, and all the other PCI-compliant units share the PCI bus system 14 in a looped sequential manner. The other PCI-compliant units (i.e., those that use the request signals RQ0, RQ1, RQ2, and RQ3) are arranged in the second-layer access sequence loop, as respectively designated by the reference numerals 32, 34, 36, and 38 in FIG. 5. Since RQ4 is assigned to the first-layer access sequence loop, it cannot be double-assigned to the second-layer access sequence loop. However, the user is allowed to move RQ4 from the first-layer access sequence loop to the second one.

A special register RX76[0] is used to set which layer is being assigned to RQ4. For instance, if RX76[0]=0, it inhibits the RQ4 40 from being used in the first-layer access sequence loop, and when RX76[0]=1, it inhibits the RQ4 40 from being used in the second-layer access sequence loop.

If RX76[5:4]=10, the first-layer access sequence loop is set to CPI→RQ4→PCI→CPU. The CPU 10, the RQ4 unit 40, and all the other PCI-compliant units (i.e., the RQ0 unit 32, the RQ1 unit 34, the RQ2 unit 36, and the RQ3 unit 38) can gain access to the PCI bus system 14 according to this access sequence loop. Since this first-layer access sequence loopadditionally includes one PCI and one RQ4, it allows all the PCI-compliant units (including the RQ4 unit 40 and the RQ0, RQ1, RQ2, and RQ3 units 32, 34, 36, 38) to have a higher priority level than the foregoing case of RX76[5:4]= 0X to use the PCI bus system 14, thus allowing an extended use of the PCI bus system 14 by these PCI-compliant units, particularly by video/audio-based peripheral devices for the transferring of video/audio data.

If RX76[5:4]=11, the first-layer access sequence loop is set to CPU→RQ4→PCI→RQ4→PCI→RQ4→PCI→CPU. The CPU 10, the RQ4 unit 40, and all the other PCI-compliant units (i.e., the RQ0 unit 32, the RQ1 unit 34, the RQ2 unit 36, and the RQ3 unit 38) can gain access to the PCI bus system 14 according to this access sequence loop. Since this first-layer access sequence loop additionally includes one PCI and one RQ4, it allows all the PCI-compliant units (including the RQ4 unit 40 and the RQ0, RQ1, RQ2, and RQ3 units 32, 34, 36, 38) to have an even higher priority level than the foregoing case of RX76[5:4]=10 to use the PCI bus system 14, thus allowing a more extended use of the PCI bus system 14 by these PCI-compliant units, particularly by video/audio-based peripheral devices for the transferring of video/audio data.

In the foregoing Table 1, only RQ4 is included in the first-layer access sequence loop. However, the invention also allows the user to assign either RQ0, RQ1, or RQ2 to the first-layer access sequence loop. For this, the invention provides a special register RX76[3:2] for the user to specify this information. The following Table 2 shows an example of the various values of RX76[3:2] and the corresponding request signals being set.

TABLE 2

| Content of RX76[3:2] | The Request Signal Being Set |
|---|---|
| RX76[3:2] = 00 (default) | RQ4 |
| RX76[3:2] = 01 | RQ0 |
| RX76[3:2] = 10 | RQ1 |
| RX76[3:2] = 11 | RQ2 |

Table 2 shows that if RX76[3:2]=00 (default), RQ4 is assigned to the first-layer access sequence loop as shown in Table 2. In the case of the RQ4 unit being a video/audio-based peripheral device, this setting allows the video/audio-based peripheral device to use the PCI bus system 14 with a high priority level. On a PC, the user can perform the setting of the register RX76[3:2] through the BIOS (Basic Input/Output System). In this embodiment, the default setting is RX76[3:2]=00, and therefore, after the power-on of the PC, the PCI bus system is automatically set to use the RQ4 in the higher-priority first-layer access sequence loop.

With RQ4 being assigned to the first-layer access sequence loop, all the other request signals RQ0, RQ1, RQ2, RQ3 are assigned to the low-priority second-layer access sequence loop. In the case when a video/audio-based peripheral device is mounted on a low-priority expansion slot, for example the one associated with RQ0 this video/audio-based peripheral device has to share the PCI bus system 14 with all the other low-priority units for the use of the PCI bus system 14 and hence cannot use the PCI bus system 14 for an extended period of time. In this case, the user can use the BIOS to set RX76[3:2]=01, i.e., setting RQ0 to the first-layer access sequence loop, which changes the first-layer access sequence loop to CPU→RQ0→PCI→CPU. As a result, the video/audio-based peripheral device now has a higher priority level to use the PCI bus system 14, and hence is entitled to use the PCI bus system 14 for an extended period of time for the transferring of large volumes of video/audio data. If RX76[5:4]=01, the first-layer access sequence loop is CPU→RQ0→PCI→RQ0→PCI→RQ0→PCI→CPU while the second-layer access sequence loop is SB→RQ4→RQ1→SB→RQ2→RQ3→SB. After this adjustment, the PCI-compliant unit that was originally assigned to the low-priority RQ0 is now changed to have a high priority level to use the PCI bus system 14 so that it can use the PCI bus system 14 for an extended period of time.

In the foregoing embodiment, the first-layer and second-layer access sequence loops can be changed by specifying suitable values to the RX76[5:0] and RX76[3:2] registers through the BIOS. These registers can be further coupled to all array of switches coupled between the initiator and the source of each of the request signals for selective ON/OFF of the switches for the user-specified assignment of the request signals to either the first-layer access sequence loop or the second-layer access sequence loop.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for adjusting an access sequencing scheme for a number of PCI-compliant units coupled to a PCI bus system on a computer system, the PCI-compliant units being each assigned in accordance with the access sequencing scheme to one of a set of request signals to request access to the PCI bus system, the method comprising the steps of:

providing a two-layer access sequencing structure including a first-layer access sequence loop and a second-layer access sequence loop for the request signals to be selectively assigned thereto, with the first-layer access sequence loop having a higher priority over the second-layer access sequence loop, and the first-layer access sequence loop including a number of programmable priority levels for the request signal being assigned thereto;

providing a first register and a second register, with the first register being used to specify the first-layer access sequence loop and the second register being used to specify the assignment of the request signals to either the first-layer access sequence loop or the second-layer access sequence loop;

checking whether a PCI-compliant unit associated with a request signal assigned to the second-layer access sequence loop requests for a request signal of a higher priority level; and if YES, setting the second register accordingly to assign the concerned request signal to the first-layer access sequence loop.

2. The method of claim 1, wherein each of the request signals is programmable by the second register to be inhibited from being included in the first-layer access sequence loop.

3. The method of claim 1, wherein each of the request signals is programmable by the second register to be inhibited from being included in the second-layer access sequence loop.

4. The method of claim 1, wherein each of the request signals that are originally assigned to the second-layer access sequence loop is programmable by the second register to be moved to the first-layer access sequence loop so as to acquire a higher priority level.

5. The method of claim 1, wherein the first-layer access sequence loop includes a number of options to provide various priority levels for the request signal being included therein, and which option is being selected is determined by the first register.

6. The method of claim 1, wherein the first and second registers are user-programmable through BIOS.

7. The method of claim 5, wherein the first register is coupled to an array of switches coupled between the initiator and the target of each of the request signals for selective ON/OFF of the switches to provide a user-specified priority level for the request signal being included in the first-layer access sequence loop.

8. The method of claim 1, wherein the first register and the second register are in the same register set.

9. A method for adjusting an access sequencing scheme for a number of PCI-compliant units coupled to a PCI bus system on a computer system, the PCI-compliant units being each assigned in accordance with the access sequencing scheme to one of a set of request signals to request access to the PCI bus system, the method comprising the steps of:

providing a two-layer access sequencing structure including a first-layer access sequence loop and a second-layer access sequence loop for the request signals to be selectively assigned thereto, with the first-layer access sequence loop having a higher priority over the second-layer access sequence loop and the first-layer access sequence loop including a number of programmable priority levels for the request signal being assigned thereto;

checking whether a PCI-compliant unit associated with a request signal assigned to the second-layer access sequence loop requests for a request signal of a higher priority level; and if YES, reassigning the concerned request signal from the second-layer access sequence loop to the first-layer access sequence loop.

10. The method of claim 9, wherein the reassigning step is carried out by changing register values through BIOS.

11. The method of claim 9, wherein the reassigning step is carried out through the use of an array of switches coupled between the initiator and the source of each of the request signals for selective ON/OFF of the switches for the reassignment of the concerned request signals between the first-layer access sequence loop and the second-layer access sequence loop.

12. A method for adjusting an access sequencing scheme for a number of PCI-compliant units coupled to a PCI bus system, the PCI-compliant units asserting request signals respectively to request accessing to the PCI bus system, the method comprising the steps of:

providing a high priority access sequence loop and a low priority access sequence loop, wherein the high priority access sequence loop including a number of programmable priority levels; and selecting a high priority request signal among the request signals, and assigning the high priority request signal to the high priority access sequence loop.

13. The method of claim 12, further comprising steps of:

checking whether a request signal assigned to the low priority sequence loop needs to be changed to a higher priority level; and if YES, assigning said request signal accordingly to the high priority access sequence loop.

* * * * *